(12) United States Patent
Lokamathe et al.

(10) Patent No.: US 9,774,577 B2
(45) Date of Patent: Sep. 26, 2017

(54) DEVICE, SYSTEM AND METHOD PROVIDING DATA SECURITY AND ATTRIBUTE BASED DATA ACCESS IN PARTICIPATORY SENSING

(71) Applicant: Tata Consultancy Services Limited, Mumbai (IN)

(72) Inventors: Shivraj Vijayshankar Lokamathe, Bangalore (IN); Rajan Mindigal Alasingara Bhattachar, Bangalore (IN); Barkur Suryanarayana Adiga, Bangalore (IN); Meena Singh Dilip Thakur, Bangalore (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 201 days.

(21) Appl. No.: 14/737,605

(22) Filed: Jun. 12, 2015

(65) Prior Publication Data
US 2015/0372997 A1 Dec. 24, 2015

(30) Foreign Application Priority Data
Jun. 24, 2014 (IN) .......................... 2029/MUM/2014

(51) Int. Cl.
*H04L 29/06* (2006.01)
*H04L 9/30* (2006.01)

(52) U.S. Cl.
CPC .............. *H04L 63/062* (2013.01); *H04L 9/30* (2013.01); *H04L 63/0428* (2013.01); *H04L 63/06* (2013.01)

(58) Field of Classification Search
CPC ... H04L 63/062; H04L 63/06; H04L 63/0428; H04L 9/30
See application file for complete search history.

(56) References Cited

U.S. PATENT DOCUMENTS 8,443,115 B2 5/2013 Kotzin
8,635,464 B2 1/2014 Yacobi
(Continued)

OTHER PUBLICATIONS

Liu et al., Ciphertext-PolicyWeighted Attribute Based Encryption for Fine-Grained Access Control, Sep. 2013, 5th International Conference on Intelligent Networking and Collaborative Systems, pp. 51-57.*

(Continued)

*Primary Examiner* — Kenneth Chang
(74) *Attorney, Agent, or Firm* — Shumaker, Loop & Kendrick, LLP

(57) ABSTRACT

Disclosed are devices, systems, and methods for securing data using attribute based data access. The data may correspond to a sensory environment, and the data is secured at the device. The device secures the data by segmenting the data into number of segments and defining an access policy, further submitting the access policy to a PKG of system for generating Access Tree having attributes at different level for accessing the data. These Access Trees are securely stored on the device using IBE mechanism. Further, the data after being secured, is uploaded to a system for analysis. At the system, an access request may be received for accessing the data. The access request further includes a request attribute, whereby the system verifies if the attribute satisfies the Access Policy. If the verification is positive, an access may be provided to the data accessor for accessing the data.

14 Claims, 11 Drawing Sheets

(56) References Cited

U.S. PATENT DOCUMENTS

| | | | | |
|---|---|---|---|---|
| 2002/0147920 | A1* | 10/2002 | Mauro | G06Q 20/367 |
| | | | | 726/26 |
| 2008/0022361 | A1* | 1/2008 | Bharadwaj | G06F 21/6209 |
| | | | | 726/2 |
| 2009/0080658 | A1* | 3/2009 | Waters | G06F 21/6218 |
| | | | | 380/277 |
| 2010/0023757 | A1* | 1/2010 | Nguyen-Huu | H04L 12/58 |
| | | | | 713/156 |
| 2012/0144210 | A1* | 6/2012 | Yacobi | H04L 9/0836 |
| | | | | 713/193 |
| 2012/0155635 | A1* | 6/2012 | Vaikuntanathan | H04L 9/0825 |
| | | | | 380/44 |
| 2012/0260094 | A1* | 10/2012 | Asim | G06F 21/10 |
| | | | | 713/171 |

OTHER PUBLICATIONS

Guoxing Zhan and Weisong Shi, Senior Member, IEEE, "An Elastic, Privacy-preserving Participatory Sensing Platform System and its Health Care Applications" Retrieved date Sep. 6, 2015 (8 pages).

Jason Crampton, "Cryptographic Enforcement of Role-Based Access Control", Information Security Group, Royal Holloway, University of London, dated 2011(15 pages).

Kai Dong, Tao Gu, Xianping Tao, Jian Lu, "Privacy Protection in Participatory Sensing Applications Requiring Fine-Grained Locations" 16th International Conference on Parallel and Distributed Systems, dated 2010 (8 pages).

\* cited by examiner

DEVICE, SYSTEM AND METHOD PROVIDING DATA SECURITY AND ATTRIBUTE BASED DATA ACCESS IN PARTICIPATORY SENSING

CROSS-REFERENCE TO RELATED APPLICATIONS AND PRIORITY

The present application claims priority to Indian Patent Application No. 2029/MUM/2014, filed on Jun. 24, 2014 the entirely of which is hereby incorporated by reference.

TECHNICAL FIELD

The present subject matter described herein generally relates to a device, method, and system for providing access to data, and more specifically relates to, providing attribute based access to the data in participatory sensing.

BACKGROUND

One major concern in a participatory sensing framework is privacy leakage i.e., leakage of data which may be private or confidential in nature. In the participatory sensing framework, a number of participants are involved in collecting and sharing the data to a centralized server. The data shared may be survey data or personal data. The data may be monitored and captured using sensor(s) installed/attached with a device of the participants. The data captured corresponds to different monitoring areas like forest monitoring, traffic monitoring, health monitoring, disaster monitoring, road surface monitoring, pollution check, location monitoring, and other types of monitoring areas.

Further, the data captured is uploaded to the centralized server of the participatory sensing frameworks for further analysis. Since, the data is confidential in nature, great concerns exist regarding trustworthiness and privacy leakage for the data owner. These concerns may discourage the participants to actively participate and upload the data for further analysis. One primary reason behind such a privacy concern is involvement of third party vendors capable of accessing such data uploaded on the centralized server. Thus, data security and data owner privacy remains a high concern for the participants before sharing the data with the participatory sensing framework.

Another concern is limited scope provided by participatory sensing applications, as most of the participatory applications are custom developed and they don't provide data security and privacy. As the participatory sensing applications are custom developed, the usage of such participatory sensing applications are restricted to only research purposes, and only a small group of people have access to such participatory sensing applications. These small groups of people do not have control on the data security and data privacy of the data shared over the centralized server.

Though, some of these sensing frameworks utilizes communication channel security techniques like Secure Socket Layer (SSL) and Rivest-Shamir-Adleman (RSA) techniques for securing the data, however, a need of installing public key infrastructure (PKI) and continuously providing administration services to distribute and maintain certificates for validation still remains.

SUMMARY

Disclosed are devices, systems, and methods for facilitating attribute based access to data, and the aspects are further described below in the detailed description. This summary is not intended for use in determining or limiting the scope of the subject matter.

In one implementation, a device is provided for securing data, which includes a processor and a memory coupled to the processor for executing a plurality of modules stored in the memory. The device may further include a plurality of sensors to capture data in one or more formats. The plurality of modules includes a segmenting module, a defining module, a submitting module, a receiving module, an encrypting module, privacy metric module, an uploading module, and a public key generation (PKG) module. The segmenting module segments the data into a plurality of data segments. Further, the defining module defines an access policy corresponding to a data segment of the plurality of data segments. The access policy includes a plurality of attributes associated with a plurality of data accessors. Further, an attribute of the plurality of attributes indicates an accessing right of a data accessor for accessing the data segment. Further, the submitting module submits the access policy to a system or to the public key generation (PKG) module of the device. Further, the receiving module receives an access tree associated with the access policy from the system or from the public key generation (PKG) module. The access tree includes the plurality of attributes arranged in a hierarchy using a set of boolean operators. Further, each attribute, of the plurality of attributes, present in the access tree is associated with an encryption key. Further, the encrypting module encrypts the data segment using the encryption key associated with each attribute, wherein the encryption key is obtained using an attribute based encryption scheme. Further, the privacy metric module is provided for computing privacy leakage for the plurality of data segments. Further, the uploading module uploads the plurality of data segments in an encrypted form to the system, whereby the system facilitates accessing of the plurality of data segments to the plurality of data accessors.

In another implementation, disclosed is a method for securing data to be accessed by a plurality of data accessors. The method includes a step of capturing data in one or more formats. The method further includes a step of segmenting the data into a plurality of data segments. Further, the method includes a step of defining an access policy corresponding to a data segment of the plurality of data segments. The access policy includes a plurality of attributes associated with a plurality of data accessors, wherein an attribute of the plurality of attributes indicates an accessing right of a data accessor for accessing the data segment. The method further includes a step of submitting the access policy to a system or to a public key generation (PKG) module of the device. Further, the method includes a set of receiving an access tree associated with the access policy from the system or from the public key generation (PKG) module. Further, the access tree includes a plurality of attributes arranged in hierarchy using a set of boolean operators. Further, each attribute, of the plurality of attributes, present in the access tree is associated with an encryption key. Further, the method includes a step of encrypting the data segment using the encryption key associated with each attribute, wherein the encryption key is obtained using attribute based encryption (ABE) scheme. Further, the step of capturing data, the segmenting, the defining, the submitting, the receiving, and the encrypting are performed by a processor.

In yet another implementation, disclosed is a non-transitory computer readable medium embodying a program executable in a computing device for securing data to be accessed by a plurality of data accessors. The program including a program code for capturing data in or more formats. Further, a program code is provided for segmenting the data into a plurality of data segments. A program code is further provided for defining an access policy corresponding to a data segment of the plurality of data segment. Further, the access policy includes a plurality of attributes associated with a plurality of data accessors, and an attribute of the plurality of attributes indicates an accessing right of a data accessor for accessing the data segment. Further, a program code is provided for submitting the access policy to a system or to a public key generation (PKG) module of the device. Further, a program code may be provided for receiving an access tree associated with the access policy from the system or from the public key generation (PKG) module. The access tree includes a plurality of attributes arranged in hierarchy using a set of boolean operators, wherein each attribute, of the plurality of attributes, present in the access tree is associated with an encryption key. Further, a program code is provided for encrypting the data segment using the encryption key associated with each attribute, wherein the encryption key is obtained using an attribute based encryption scheme.

In one implementation, disclosed is a system for facilitating access of data to a plurality of data accessors. The system includes a processor and a memory coupled to the processor for executing a plurality of modules stored in the memory. The plurality of modules includes a public key generation (PKG) module, a receiving module, a correlating module, a data access module, and a feedback module. The public key generation module receives an access policy from a device. The access policy includes a plurality of attributes associated with a plurality of data accessors. Further, an attribute of the plurality of attributes indicates an accessing right of a data accessor for accessing the data segment. The public key generation module further generates an access tree based on the access policy received. The access tree includes the plurality of attributes arranged in hierarchy using a set of boolean operators. Each attribute, of the plurality of attributes, present in the access tree is associated with an encryption key. The public key generation module further transmits the access tree to the device. The receiving module receives a plurality of data segments in an encrypted form, and access request from a data accessor, whereby the access request includes a request attribute owned by the data accessor. After receiving the request attribute, at first, the correlating module validates the request attribute based on the access policy using the access tree. Further, correlating module obtains the decryption key for an attribute of the plurality of attributes after the validation of the request attribute. Further, the data access module de-ciphers the data segment by using the decryption key, and thereafter facilitates the access of the data segment to the data accessor. Further, access of the data segment is facilitated based an attribute of the plurality of attributes owned by the data accessor. After facilitating the access, the feedback module provides a feedback to the device regarding utilization of the data at the system.

In another implementation, disclosed is a method for facilitating access of data to a plurality of data accessors. The method includes a step of generating an access tree by using an access policy received from a device. The access tree includes the plurality of attributes arranged in hierarchy using a set of boolean operators. Each attribute, of the plurality of attributes, present in the access tree is associated with an encryption key. Further, the method includes a step of transmitting the access tree to the device. Further, the method includes a step of receiving a plurality of data segments in an encrypted form, and an access request from a data accessor. The access request received includes a request attribute owned by the data accessor. After the receiving of the request attribute, the method includes step of validating the request attribute based on the access policy using the access tree. The method further includes step of obtaining a decryption key for an attribute of the plurality of attributes after the validation of the request attribute. Next, the method includes a step of de-ciphering the data segment by using the decryption key. Further, the method includes a step of facilitating the access of the data segment to the data accessor, whereby the access of the data segment is facilitated based an attribute of the plurality of attributes owned by the data accessor. After facilitating the access, the method further includes step of providing a feedback to the device regarding utilization of the data. Further, the step of the generating, the transmitting, the receiving, the validating, the obtaining, the de-ciphering, the facilitating the access and the providing the feedback are performed by a processor.

In yet another implementation, disclosed is a non-transitory computer readable medium embodying a program executable in a computing device for facilitating access of data to a plurality of data accessors. The program being a program code for generating an access tree by using an access policy received from a device. The access tree includes the plurality of attributes arranged in hierarchy using a set of boolean operators. Further, each attribute, of the plurality of attributes, present in the access tree is associated with an encryption key. Further, a program code is provided for transmitting the access tree to the device. Further, a program code is provided for receiving a plurality of data segments in an encrypted form, and an access request from a data accessor. The access request comprises a request attribute owned by the data accessor. A program code is further provided for validating the request attribute based on the access policy using the access tree. Further, a program code is provided for obtaining a decryption key for an attribute of the plurality of attributes after validation of the request attribute. After the decryption key is obtained, a program code is provided for de-ciphering the data segment by using the decryption key. Further, a program code is provided for facilitating the access of the data segment to the data accessor. Further, the access of the data segment is facilitated based an attribute of the plurality of attributes owned by the data accessor.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
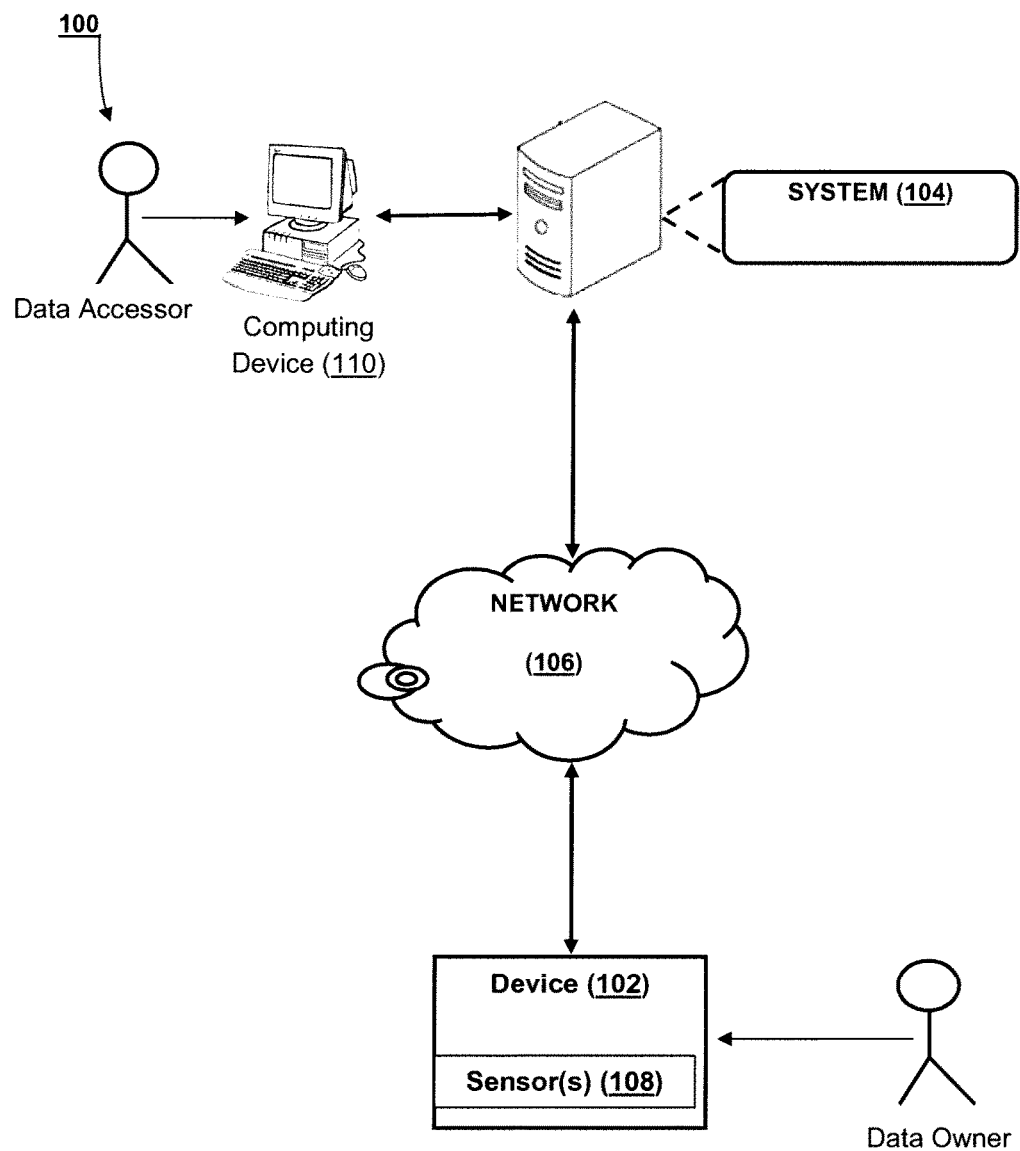
FIG. 1 illustrates a network implementation illustrating communication between a device and a system for securing data and providing access to secure data based on attribute, in accordance with an embodiment of the present subject matter.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. Disclosed are devices, systems, and methods to collect, secure and share the data and facilitating attribute based access to data. The present disclosure relates to a participatory sensing framework/platform for supporting participant privacy and data security. The participatory sensing framework involves data owners at one end, and data accessors at another end. The involvement of the data accessors, which are considered as a third party having accessing rights to the data, creates an obvious issue of privacy leakage or unauthorized access of the data. The data may be associated with various surveys conducted in various domains. To support the participatory sensing for the survey conducted in various domains, the present disclosure provides a generic solution for securing the data, and providing access to the secured data. In one example, the data may be associated with a survey conducted in a healthcare domain. The data related to the healthcare domain may be highly confidential as it may contain personal as well as health related information of patients. Thus, to protect the leakage of such highly confidential data, the present disclosure introduces a concept of attribute based access of the data and participatory sensing platform as a generic solution.

The data is collected or captured at a device belonging to the data owner, whereby the device may have one or more sensors for sensing and capturing the data. Taking an example of healthcare related data, a reading of "heart rate" may be sensed at regular time interval (after every 1 hour) by a sensor installed in the device of an individual (patient). In this example, the patient may be considered as the data owner. Further, the data may also contain age of the patient along with the heart rate reading sensed at the regular time intervals. The combination of the data i.e., the heart rate reading and the age of the patient makes data highly confidential which is further sent to the system or server for further analysis. At the server end, the confidential data may be accessed by different data accessors. The data accessors (in the healthcare monitoring) might include attributes like doctors, physicians, surgeons, anesthesiologist, or other medical practitioners. One of a purpose of accessing the confidential data uploaded at the server by the data accessors is to provide a feedback/advice to the patient (data owners) if any abnormality is detected in the heart rate readings.

But, at the same time, the access of such highly confidential data (the heart rate reading along with the age of the patient) may give a chance to the data accessor (who may act as an attacker) to start/attempt harmful activities against the patient. The attacker may access such the confidential data to identify those patients whose age is more than 80 years, and also have a high heart rate reading approximately 190 beats per minute (bmp), as it may be easier for the attacker to target such old-age patients. In one aspect of present disclosure, location of the patient may also be considered as the highly confidential data. Along with the age and heart rate reading, the attacker may also access the location data to locate the patient with an intention to attempt the harmful activities. Therefore, in spite of being beneficial, there is a rise of concern over privacy leakage of the confidential data which may result in such harmful activities in the participatory sensing platforms. Thus, to prevent such misuse of the confidential data, providing security, protecting privacy, and authorized access to the confidential data is an ultimate requirement.

To secure such confidential data captured and stored at the device of the data owner, at first, the data may be partitioned or segmented into number of data segments. For each data segment or some of the data segments, an access policy may be defined. In one aspect of present disclosure, the access policy defined may be submitted to Public Key Generation of the system or the server for generating an access tree based on the access policy. In another aspect of the present disclosure, the access policy may be submitted to a public key generation installed in the device of the data owner for generating the access tree based on the access policy. After generation of the access tree, the device may fetch the access tree from the system or the server. The access tree generated may comprise a plurality of attributes arranged in a hierarchy using of Boolean operators. Further, the plurality of attributes is associated with plurality of data accessory in a manner that each of the attribute owned by the data accessor, and the attribute indicates an accessing right/level of the data accessor. Further, with each attribute of the plurality of attributes an encryption key may be associated. Using the encryption key associated with the attribute, the number of data segments gets encrypted, whereby the encryption key is obtained using a key-policy attribute based encryption scheme (Key-Policy Attribute-Based Encryption [KP-ABE]/Ciphertext-Policy Attribute-Based Encryption [CP-ABE]) implemented using elliptical curve cryptography (ECC). Thus, the secured data segments i.e., encrypted form of the data segments may be uploaded to the system or to the server for further analysis, whereby the system or the server may be enabled for facilitating access of the data segments based on the attribute owned by the data accessor. According to an embodiment of present disclosure, the system may provide alert policy to notify the data owner and the data accessor about data upload based upon predefined conditions, wherein the predefined conditions are associated with the privacy leakage parameters. For example, if the participants (i.e., the data owner and data accessory) are interested in knowing whether there was any data uploaded with a geo location, the participants may receive alerts from the system.

However, before uploading the data segments to the system, a privacy leakage may be computed for the data segments. The privacy leakage indicates a quantitative value pertaining to the Privacy leakage in the data segments.

Thus, the system receives the data segments which are secured (i.e., the encrypted form of the data segments) and the Access Tree having the plurality of attributes from the device. Since, the data segments are highly confidential in nature, providing the accessibility of the data segments based on the attribute of the data accessor is a next step. For providing the access, the system may receive an access request having a request attribute from a data accessor willing to access a particular data segment of the data segments. It may be noted that the system may receive multiple access requests for accessing one or more data segments of the data segments.

Figure 8:
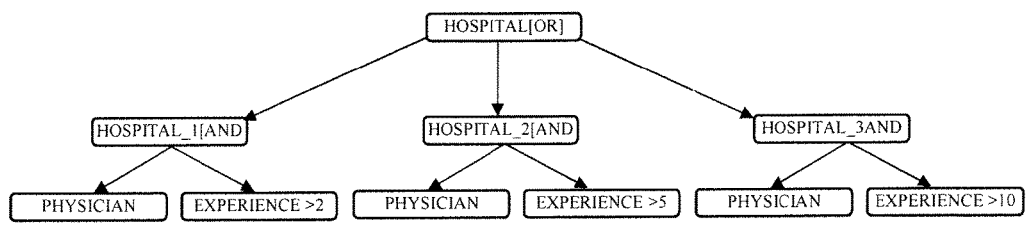
FIG. 8 illustrates an access tree that may be generated for providing access to the particular data segment including, for example, a heart rate reading.

The accessibility of the particular data segment is provided based on the plurality of attributes arranged in the access tree associated with that particular data segment. Thus, for determining the accessibility of the particular data segment, the system will check if the received request attribute (corresponding to the data accessor interested in accessing the particular data segment of the plurality of data segments) satisfies the Access Policy associated with that particular data segment. For example, FIG. 8 depicts an access tree that may be generated for providing access to the particular data segment (heart rate reading).

From the above access tree, it can be observed for accessing the particular data segment (heart rate reading), some conditions (as per the Access Tree) must be fulfilled. One of the conditions may be the heart rate reading that can be accessed either by HOSPITAL_1 OR HOSPITAL_2 OR HOSPITAL_3. Further, if the heart rate reading is accessed by the HOSPITAL_1, then the doctor should be a PHYSICIAN and EXPERIENCE should be greater than 2 years. Further, if the heart rate reading is accessed by HOSPITAL_2, then the doctor should be a PHYSICIAN and EXPERIENCE should be greater than 5 years. Further, if the heart rate reading is accessed by the HOSPITAL_3, then the doctor should be a PHYSICIAN and EXPERIENCE should be greater than 10 years.

Thus, the system matches the request attributed with the attributes defined in the access tree for providing the access to the data segment. If the request attribute is matched, a decryption key corresponding to the attribute is obtained. The decryption key obtained may be further used for deciphering the particular data segment. Thus, the system facilitates accessing of the data segments, to the data accessors, based on the attributes associated with the data accessors. The system is further enabled to provide feedback to the data owner regarding utilization of the data segments on the system or the server. In an aspect of present disclosure, the feedback mechanism may be process oriented i.e., the data accessor may decide over the level of details to be sent to the data owner. Further, the data owner, being anonymous to the system, may have to compromise on his/her anonymity for the feedback mechanism to work. For example, if the data accessor wants more detail information from the data owner, then data accessor may have to reveal more personal information about him/her on the system. Based on the response received, the feedback mechanism may provide more detailed information version to the data accessor. Thus, this process provides a fair idea regarding the utilization of the data uploaded by the data owner, and also know end-users who are being benefitted.

While aspects of described system and method for securing data and providing attribute based access to the secure data may be implemented in any number of different computing systems, environments, and/or configurations, the embodiments are described in the context of the following exemplary system.

Referring now to FIG. 1, a network implementation 100 of a system 104 and a device 102, for providing attributed based access to data is illustrated, in accordance with an embodiment of the present subject matter. Although the present subject matter is explained considering that the system 104 is implemented for on a server, it may be understood that the system 104 may also be implemented in a variety of computing systems, such as a laptop computer, a desktop computer, a notebook, a workstation, a mainframe computer, a server, a network server, and the like. In one embodiment, the device 102 and the system 104 may be implemented in a cloud-based environment. According to an embodiment, the device 102 may comprise one or more sensors 108 such as accelerometer, gyroscope, an image capturing device, compass, barometer, add-on connectivity chips, healthcare sensors, and other types of sensors installed upon a mobile device. Further, the mobile device may be smart-phone, laptop, notebook, and the like of a data owner.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Hypertext Transfer Protocol Secure (HTTPS), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
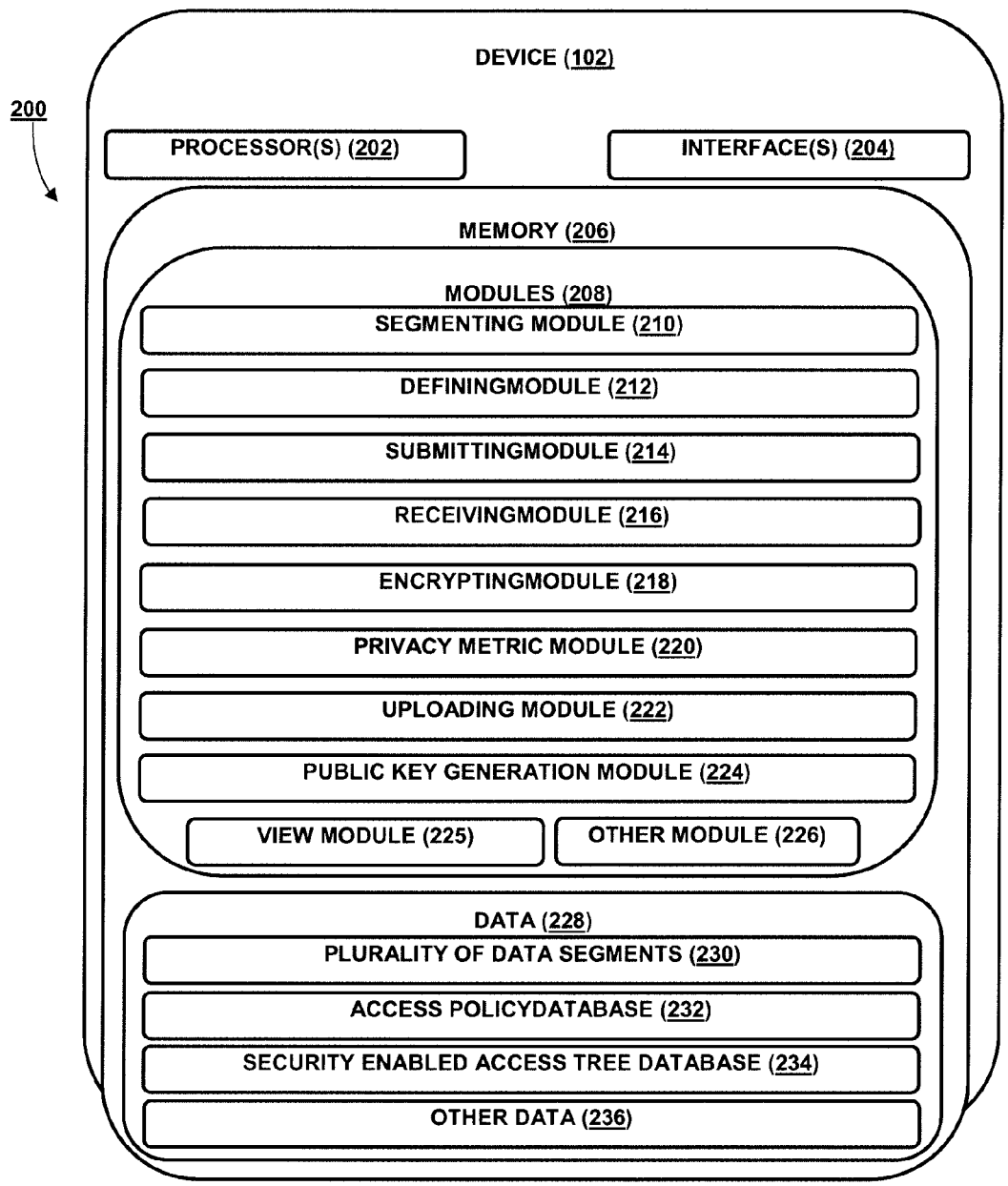
FIG. 2 illustrates the device, in accordance with an embodiment of the present subject matter.

Referring now to FIG. 2, the device 102 is illustrated in accordance with an embodiment of the present subject matter. In one embodiment, the device 102 may include a processor 202, an input/output (I/O) interface 204, and a memory 206. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute programmed instructions stored in the memory 206.

The I/O interface 204 may include a variety of software and hardware interfaces, for example, a web interface, a graphical user interface, and the like. The I/O interface 204 may allow the device 102 to interact with a system 104. Further, the I/O interface 204 may enable the device 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 228.

The modules 208 include routines, programs, objects, components, data structures, etc., which perform particular tasks or implement particular abstract data types. In one implementation, the modules 208 may include segmenting module 210, a defining module 212, a submitting module 214, a receiving module 216, an encrypting module 218, a privacy metric module 220, an uploading module 222, a public key generation (PKG) module 224, view module 225, and other modules 226. The other modules 226 may include programs or coded instructions that supplement applications and functions of the device 102.

The data 228, amongst other things, serves as a repository for storing data processed, received, and generated by one or more of the modules 208. The data 228 may also include a plurality of data segments 230, an access policy database 232, a security enabled access tree database 234, and other data 236. The other data 236 may include data generated as a result of the execution of one or more modules in the other modules 226.

Figure 3:
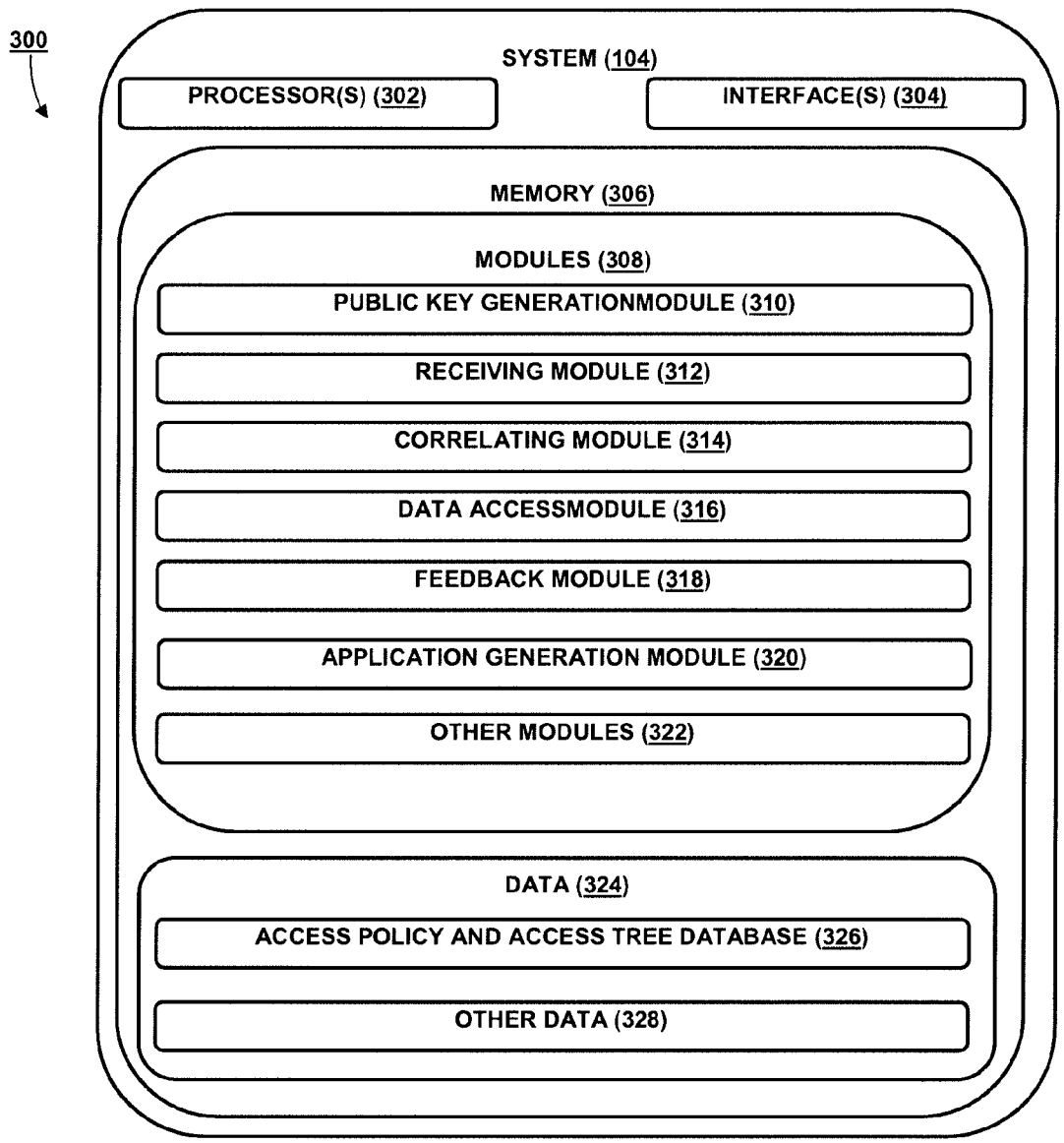
FIG. 3 illustrates the system, in accordance with an embodiment of the present subject matter.

Referring now to FIG. 3, the system 104 is illustrated in accordance with an embodiment of the present subject matter. In one embodiment, the system 104 may include a processor 302, an input/output (I/O) interface 304, and a memory 306. The processor 302 may be implemented as one or more microprocessors, microcomputers, microcontrollers, digital signal processors, central processing units, state machines, logic circuitries, and/or any devices that manipulate signals based on operational instructions. Among other capabilities, the processor 302 is configured to fetch and execute programmed instructions stored in the memory 306.

The I/O interface 304 may include a variety of software and hardware interfaces, for example, a web interface, a graphical user interface, and the like. The I/O interface 304 may allow the system 104 to interact with a device 102. Further, the I/O interface 304 may enable the system 104 to communicate with other computing devices, such as web servers and external data servers (not shown). The I/O interface 304 can facilitate multiple communications within a wide variety of networks and protocol types, including wired networks, for example, LAN, cable, etc., and wireless networks, such as WLAN, cellular, or satellite. The I/O interface 304 may include one or more ports for connecting a number of devices to one another or to another server.

The memory 306 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 306 may include modules 308 and data 324.

The modules 308 include routines, programs, objects, components, data structures, etc., which perform particular tasks or implement particular abstract data types. In one implementation, the modules 308 may include a Public Key Generation (PKG) module 310, a receiving module 312, a correlating module 314, a data access module 316, a feedback module 318, an application generation module 320, and other modules 322. The other modules 322 may include programs or coded instructions that supplement applications and functions of the system 104.

The data 324, amongst other things, serves as a repository for storing data processed, received, and generated by one or more of the modules 308. The data 324 may also include an Access Policy and Access Tree database 326, and other data 328. The other data 328 may include data generated as a result of the execution of one or more modules in the other modules 322.

Figure 4:
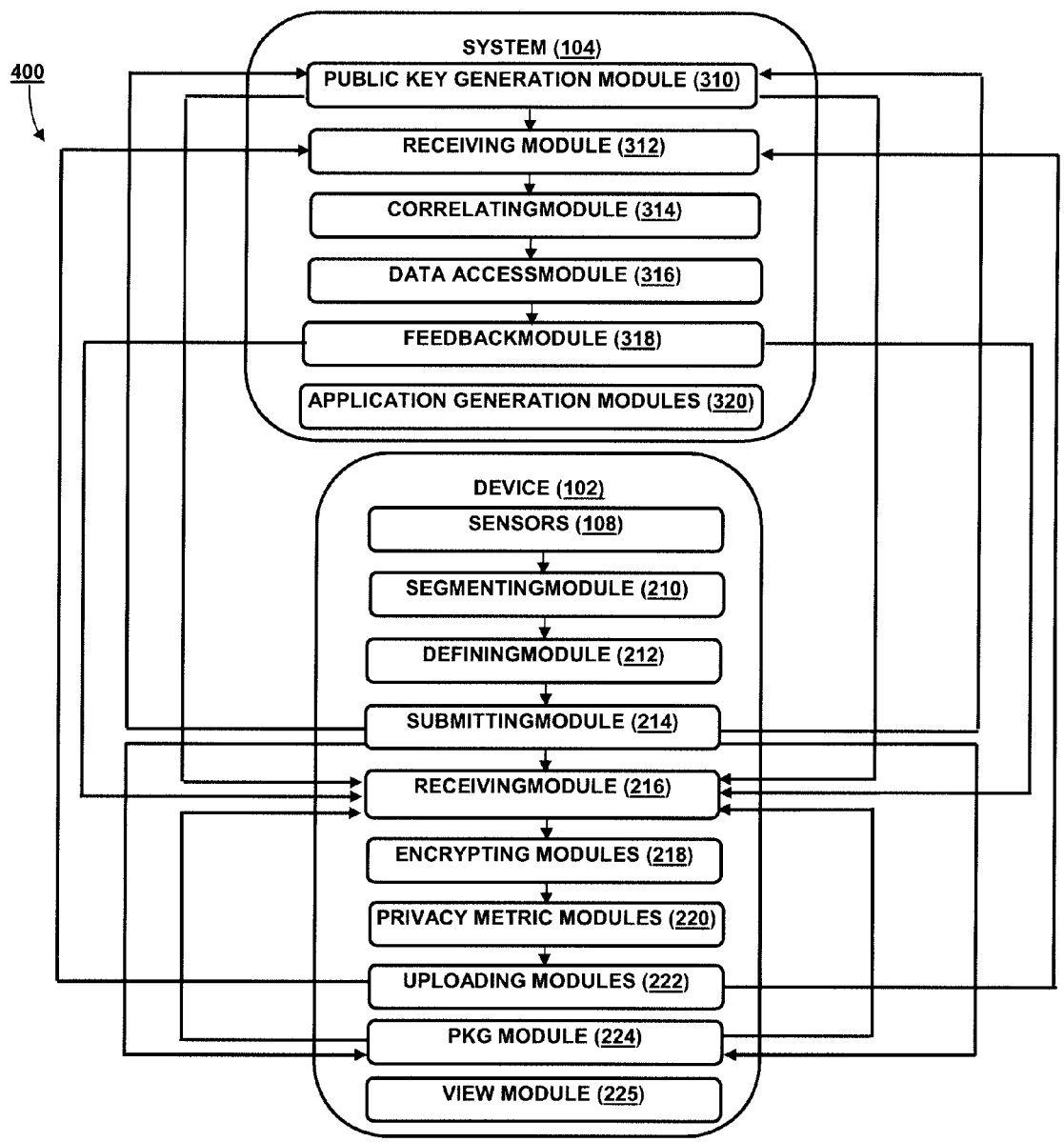
FIG. 4 illustrates a detail working of the device and the system, in accordance with an embodiment of the present subject matter.

Referring to FIG. 4, a detailed working of components involved for securing data and providing attribute based access to the data is illustrated, in accordance with an embodiment of the present subject matter. The components involved may be a device 102 and a system 104. All the components may be connected over a network 106 as shown in FIG. 1. The present subject matter may be considered as one of an implementation of participatory sensing platform/framework where privacy leakage concerns regarding the data of the participants (data owner as shown in FIG. 1) are addressed. In the participatory sensing framework, two parties may be involved. One party is the data owner having the device 102 and another party is data accessor (FIG. 1) having a computing device 110, whereby the device 102 and the computing device 110 are connected with the system 104 (a centralized server where the participatory sensing framework is implemented) via a communication network 106.

According to embodiments of present disclosure, the device 102 may be registered with the system 104. The system 104 may be considered as a generic solution for providing attribute based data access irrespective of domain of the data being captured. Since, the data may correspond to survey conducted in various domains; a domain-specific application may be required for securing the data, and providing attribute-based access to the secured data. For getting the domain-specific application from the system 104, the submitting module 214 of the device 102 may submit a domain-specific configuration file comprising configuration parameters and configuration settings which are to be considered for the survey to the system 104. According to embodiments, the configuration parameters may comprise data attributes (which the data owner wants to collect), data formats, and data domain. The system 104 may read the configuration file and carries out the validation of the configuration parameters and configuration settings. On the successful validation, the application generation module 320 of the system 104 may create a suitable domain (based on the domain associated with the configuration files). After creating the domain, the application generation module 320 may create database definition language [ddl], and the database as per the format and data type mentioned in the configuration file. Further, the application generation module 320 generates necessary graphical user interface (GUI) which may include all the configuration parameters as requested in the configuration file. Further, the application generation module 320 may package a new application package file (apk file) distribution. Thus, the data owner may download the new apk on the device 102 and start the survey. In another embodiment, the data accessor may also have a separate application package file (apk file) in order to submit the attributes and further view the data segments. Thus, the data accessor can also download the apk file. Further, the system 104 provides the data accessor as well as data owner (acting as data accessor) to view the data segments. Further, the data accessibility is based on successful validation of the access tree policy. In one embodiment, the data owner (acting as data accessor) may access the data segments using the view module 225 of the device 102.

In general, at the participatory sensing framework different sensory data related to various sensory topics may be used for analysis. For example, at urban level, the sensory data may be captured against sensing topics like, but not limited to, traffic monitoring, disaster monitoring, road surface monitoring, pollution check, and location monitoring. For capturing such sensory data, different sensors or sensing equipments may be used. These sensors may be well equipped for sensing or capturing the sensory data corresponding to the different sensing topics. For example, if the sensing topic is the location monitoring, then the sensors like camera and Global Positioning System (GPS) sensors may be used for capturing sensory data such as images and latitude and longitude detail of the location. Similarly, if the sensing topic is considered as the disaster monitoring, then the sensors like thermal sensors, microwave sensors, infrared sensors etc may be used for capturing the sensory data related to active fires, earth deformation (detected during and after earthquakes or volcanic eruptions), and flood respectively.

According to embodiments of the present disclosure, these sensors 108 (capable for capturing the sensory data) may be installed upon or coupled with the device 102 of the data owner. The "sensory data" hereinafter referred as "data" after being captured/sensed may stored in a memory 206 of the device 102. Considering the location monitoring as the sensing topic, the data captured and stored may be the latitude and the longitude of different locations. According to an embodiment of the present disclosure, the data captured i.e., the latitude and the longitude, during the location monitoring, of two different locations for a city "Bengaluru" is shown in Table 1 below.

TABLE 1

Data captured i.e., latitude and longitude for two different locations during location monitoring.

| Location | Data (Sensory Data) | |
|---|---|---|
| | Latitude | Longitude |
| Kempegowda Bus Station (KBS) | 12.9768 N | 77.5726 E |
| Vydehi hospital Bengaluru | 12.9752267 N | 77.7292916 E |

In the present example, the data captured (12.9768 N, 77.5726 E; and 12.9752267 N, 77.7292916 E) indicates the latitude and the longitude of the data owner respectively, and thus the actual position of the data owner may be located. Therefore, it may be understood that locating the actual position of the data owner without taking his/her consent may breach over the privacy concerns of the data owner. Also, the data captured (12.9768 N, 77.5726 E; and 12.9752267 N, 77.7292916 E) may be misused by a suspicious person (who may pretend to act as the data accessor) for locating the actual location of the data owner. Thus, to prevent such misuse of the data, securing the data and further providing attribute based access of the data after being secured is an ultimate goal of the present disclosure.

According to embodiments of the present disclosure, the securing of the data may be performed at the device 102 using Identity Based Encryption (IBE). Further, it may be noted that a method for securing the data using the Identity Based Encryption (IBE) scheme is disclosed in an Indian Patent application 1163/MUM/2013 incorporated as a reference. One purpose of securing the data is to ensure that there is no data theft in case of device 102 theft or unauthorized person usage of the device 102. Thus, after the data is captured and stored at the device 102, the segmenting module 210 of the device 102 segments the data into plurality of data segments 228. The plurality of data segments 228 may be stored in the memory 206 of the device 102. Taking the above example of the data as shown in the Table 1 i.e., the latitude as 12.9768 N, 12.9752267 N and the longitude as 77.5726 E, 77.7292916 E, the data is segmented. The data in the form of the latitude and the longitude may be segmented into the plurality of data segments. The plurality of data segments may be in terms of coarse data and a fine data. The coarse data corresponds to values before the decimal point, and the fine data corresponds to values after the decimal point. Further, the values before the decimal point may be referred as "characteristic value", and the values after the decimal point may be referred as "mantissa value". Thus, the coarse data from the latitude (12.9768 N, 12.9752267 N) and the longitude (77.5726 E, 77.7292916 E) is considered as 12 N and 77 E i.e., the characteristic values (before the decimal point). Whereas, the fine data from the latitude (12.9768 N, 12.9752267 N) and the longitude (77.5726 E, 77.7292916 E) is considered 0.9768, 0.9752267, 0.5726, and 0.7292916. After the segmentation, the plurality of data segments (i.e., the coarse data and the fine data) is shown in Table 2.

TABLE 2

Coarse data and Fine data

| | Plurality of Data Segments | |
|---|---|---|
| Location | Coarse Data (a data segment) | Fine Data (a data segment) |
| Kempegowda Bus Station (KBS) | 12 N | 0.9768 |
| | 77 E | 0.5726 |
| Vydehi hospital Bengaluru | 12 N | 0.9752267 |
| | 77 E | 0.7292916 |

In general, if the latitude and the longitude is simply specified as 12 N and 77 E (considering only the characteristic values i.e., the coarse data), then the location may be determined only as Bengaluru, and not the exact position/location within the Bengaluru. Thus, according to the Table 2, the coarse data i.e., 12 N and 77 E can only help in locating the data owner at city level i.e., Bengaluru.

In the contrary, the fine data provides more detailed information sufficient for locating the exact location/position of the data owner within the city i.e., Bengaluru. As it can be observed from Table 2 that the fine data 0.9768 and 0.5726 which belongs to the latitude and the longitude (of the city Bengaluru) along with the coarse data 12 N and 77 E respectively are sufficient for locating the exact location i.e., "Kempegowda Bus Station (KBS)". Similarly, the fine data 0.9752267 and 0.7292916 which belongs to the latitude and the longitude (of the city Bengaluru) along with the coarse data 12 N and 77 E respectively are sufficient for locating the exact location i.e., "Vydehi hospital Bengaluru". Therefore, the location data may be in form of coarse data and fine data which is subject to the attributes owned by the data accessor. In case, the data accessor does not own any data, then only the coarse data is provided to the data accessor. Whereas, if the data accessor fulfills the access policy defined by the data owner, the system 104 may provide the coarse data as well as the fine data to the data accessor. Thus, it may be concluded from the present example, that amongst the plurality of data segments (i.e., the coarse data and the fine data), the fine data (a data segment) is highly confidential in nature in relative to the coarse data (a data segment), and thus the fine data is subject to the privacy leakage.

After the data is segmented into the coarse data and the fine data, the defining module 212 of the device 102 may be configured to define the access policy corresponding to a data segment of the plurality of data segments. The access policy comprises plurality of attributes associated with a plurality of data accessory. An attribute of the plurality of attributes indicates an accessing right of the data accessor for accessing the data segment. According to embodiments, two different attribute based encryption schemes may be used such as Key-Policy Attribute-Based Encryption (KP-ABE) and Ciphertext-Policy Attribute-Based Encryption (CP-ABE). In case, if the KP-ABE is used, a submitting module 214 of the device 102 submits the access policy to the system 104. The access policy received by the system 104 further processed by a Public Key Generation (PKG) module 310 of the system 104 for generating an Access Tree. Further, the Access Tree generated by the PKG module 310 may be received by a receiving module 216 of the device 102. In another case, if the CP-ABE is used, the submitting module 214 of the device submits the access policy to a public key generation (PKG) module 224 of the device 102. Further, the PKG module 224 generates the Access Tree based on the access policy. In this case, the receiving module 216 of the device receives the Access Tree from the PKG module 226 of the device instead of PKG module 310 of the system 104. In case of CP-ABE, the data owner creates the access policy as part of the cipher text and generates the access policy on his/her own, and submits the cipher text along with the access policy to the system 102. The data assessor who owns the attributes may approach to the PKG module 310 to get the decryption keys related to the plurality of attributes. Further, with the CP-ABE, the data accessor can decrypt the data segment using the decryption keys. Further, the Access Tree received may be assigned to the data segment for encryption operation. The access policy defined may be stored in the access policy database 230 of the device 102. The access tree received from the system 104 comprises plurality of attributes arranged in hierarchy using a set of boolean operators. Further, with each attribute, of the plurality of attributes, an encryption key is associated. Further, the attribute of the plurality of attributes indicates an accessing right or accessing level of a data accessor for accessing the data segments. In the present example, there are two data segments (coarse data and fine data) derived from the data corresponding to latitude and longitude of two different locations (Table 2). For the two data segments, the access trees may be generated having the plurality of attributes. The access tree having the plurality of attributes is shown in Table 3 below.

TABLE 3

Access tree having plurality of attributes.

| Table Ref | Access Tree | Attributes |
|---|---|---|
| Table 2 | (Director\|Manager\|Dy. Manager\|Supervisor) | Director, Manager, Dy. Manager, Supervisor |

Figure 9:
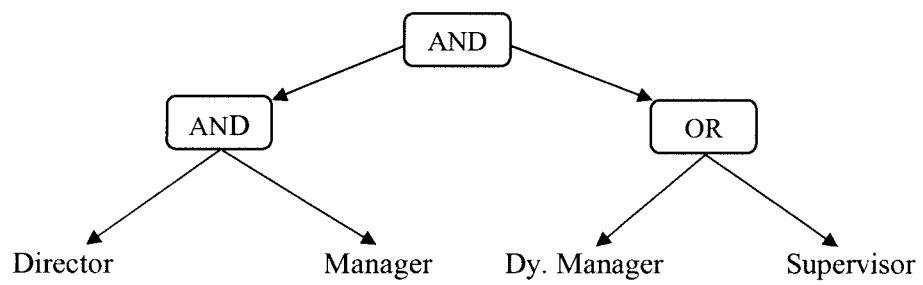
FIG. 9 illustrates is an access tree generated for the data segment (coarse data) that uses the set of boolean operators (AND, OR, and NOT).

As it may be observed from the Table 3 that the access tree is having four levels of attributes i.e., "Director", "Manager", "Dy. Manager" and "Supervisor". Further, the attributes in the access tree are arranged in a hierarchy using a set of Boolean operators. The arrangement defines the access level of each attribute for accessing the data segments. In one example, for accessing the data segment i.e., coarse data, the access policy may be defined by the defining module 212 in such a manner that, the access of the coarse data may be provided to the attributes "Director", "Manager", and either of the "Dy. Manager" or the "Supervisor". Based on the access policy defined, the PKG module 310 of the system 104 generates an access tree (Access Tree 1) using the set of boolean operators (AND, OR, and NOT) as shown in FIG. 9. FIG. 9 is an Access Tree 1 generated for the data segment (coarse data).

It can be observed from the Access Tree 1 that the coarse data is accessible by the attributes "Director", "Manager", and either of the "Dy. Manager" or the "Supervisor".

Figure 10:
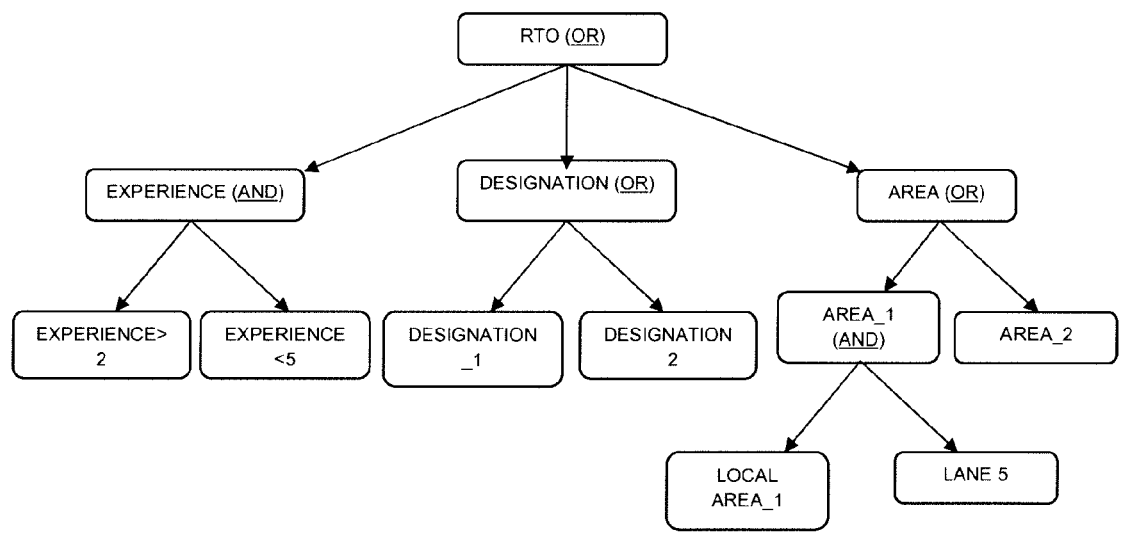
FIG. 10 illustrates another access tree generated for the data segment (coarse data) that uses the set of boolean operators (AND, OR, and NOT).

In another example of present disclosure, for accessing the data segment i.e., the coarse data, an access policy may be defined by the defining module 212 in such a manner that the access of the coarse data may be provided to a Regional Transport Officer (RTO) having attributes such as {([EXPERIENCE>2] & [EXPERIENCE<5]) & ([DESIGNATION_1]|[DESIGNATION_2]) & {([LOCAL_AREA_1] & [LANE_5])|[AREA_2])}}. Based on the access policy defined, the PKG module 310 of the system 104 generates an access tree FIG. 10 (Access Tree 2) using the set of boolean operators (AND, OR, and NOT). FIG. 10 depicts Access Tree 2 generated for the data segment (coarse data)

It can be observed from the Access Tree 2 that different attributes are provided for the RTO for accessing the data segment (i.e., coarse data). In one scenario, the coarse data may be accessed by the RTO having an experience between 2-5 years. In another scenario, the coarse data may be accessed by the RTO holding designation as "Designation_1" or "Designation_2". Yet, in another scenario, the coarse data may be accessed by the RTO having an address either in "Area_1" or "Area_2". Further, if the RTO is having address as "Area_1", then he/she should have detailed address as "Local Area 1" and "Lane 5".

Figure 11:
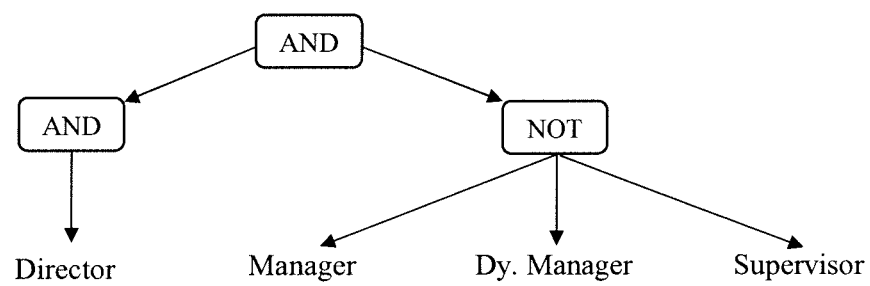
FIG. 11 illustrates yet another access tree defined for the data segment (fine data).

Similarly, for accessing the another data segment i.e., the fine data, the access tree in FIG. 11 is (access tree 3) generated by the PKG 310. FIG. 11 depicts Access Tree 3 defined for the data segment (fine data).

From the Access tree 3, it can be observed that the fine data is accessible only by the attribute as "Director". No other attributes, other than the Director, are allowed to access the fine data. The purpose of generating the access trees (Access Tree 1, Access Tree 2, and Access Tree 3) is to define the accessing right/accessing level of the attributes present in the access tree. Since, the coarse data (as per the present example) provided can be only helpful in determining the city of the data owner. Whereas, the fine data (as per the present example) facilitates more detailed information in relative to the coarse data. Access of the fine data along with the coarse data helps in determination of the exact location of the data owner, and thus the fine data is considered to be highly confidential. Thus, to restrict the access of such highly confidential data, the Access Tree 3 is defined, as it can be observed that only the data accessor holding the attribute as the "Director" level is authorized to access the fine data. Further, it may be noted to a person skilled in art, that the Access Tree 1, Access Tree 2, and the Access Tree 3 may be defined using other attributes in addition of the attributes as shown in the Table 3. It may be further noted to the person skilled in the art, that the attributes may be arranged in different fashion, using the set of Boolean operators, other than as shown in the Access Tree 1, Access Tree 2, and the Access Tree 3. According to embodiments of present disclosure, the Access Policy defined may be stored in Access Policy database 230 of the device 102. Further, the Access Tree generated by the PKG module 310 or by the PKG module 224 is further received by the receiving module 216 of the device 102 may be stored in a security enabled access tree database 234 of the device 102.

After receiving the access trees, the encryption module 218 of the device 102 may be configured to encrypt the data segments (coarse data and fined data) using an encryption key associated with each attribute. The encryption key is obtained by using a Key policy attribute based encryption (KP-ABE)/Ciphertext-policy attribute based encryption (CP-ABE) technique and Elliptic Curve Cryptography (ECC). In case of CP-ABE, the data owner creates the access policy as part of the cipher text and generates the access policy on his/her own, and submits the cipher text along with the access policy to the system 102. The data assessor who owns the attributes may approach to the PKG module 310 to get the decryption keys related to the plurality of attributes. Further, with the CP-ABE, the data accessor can decrypt the data segment using the decryption keys. Further, the encryption key may be stored in the security enabled access tree database 234 the device 102. Thus, by incorporating a lightweight elliptic curve cryptography (ECC) with the KP-ABE/CP-ABE scheme, a faster, lightweight and a certificate less distribution of the encryption keys is provided to the plurality of attributes. Further, it may be noted that a method implanting the lightweight elliptic curve cryptography (ECC) technique is disclosed in an Indian Patent application 2907/MUM/2013 incorporated as a reference. Thus, a particular data segment is accessible by only those data accessors owning the attribute authorized for accessing the particular data segment, and based on the encryption key of the attribute. Thus, by using the KP-ABE/CP-ABE and the elliptic curve cryptography, the data segments get secured at the device 102. Further, the uploading module 222 of the device 102 may be configured to upload the data segments i.e., coarse data and fine data (after being encrypted), and the access trees (Access tree 1 and Access tree 2) to the system 104, whereby the system facilitates the accessing of the data segments to the data accessors.

According to embodiments of present disclosure, before uploading the data segments to the system 104, the privacy metric module 220 of the device 102 may be provided for computing privacy metric corresponding to data segments, whereby the privacy metric indicates privacy leakage within the data segments. Referring back to the Table 2 of the present disclosure, the data segments i.e., the coarse data and the fine data can be considered for computing the privacy metric. As it has been explained earlier, that the fine data provides detailed information in relative to the coarse data. Thus, for computing the privacy metric, only the fine data is considered, as the fine data is highly confidential in nature and subject to Privacy Leakage. From the Table 2, it can be observed that the coarse data represents the characteristic values i.e., the values before the decimal point, and the fine data represents the mantissa values i.e., the values after the decimal point. The combination of the coarse data and the fine data gives the latitude and the longitude of the location. For example, the combination of 12 (coarse data i.e., the characteristic value) and 0.9768 (fine data i.e., the mantissa value) provides the latitude of the location "Kempegowda Bus Station (KBS)". Similarly, the combination of 77 (coarse data i.e., the characteristic value) and 0.5726 (fine data i.e., the mantissa value) provides longitude of the location "Kempegowda Bus Station (KBS)".

For computing the privacy metric, consider the values read by the latitude/longitude as C1C2C3 . . . and M1M2M3M4 . . . Mk, where the C1C2C3 are characteristic values and the M1M2M3M4 are the mantissa values. The characteristic values C1C2C3 may not be considered for computing the privacy metric, whereas the M1M2M3M4 i.e., the mantissa values are factor of main consideration for privacy metric computing. For computing the privacy metric, the following assumptions and parameters may be considered as:

Let number of digits in mantissa be termed as k,

Let number of digits in mantissa while uploading the data be termed as n,

Distributing weight of 100% among the components of latitude and longitude, where Weight $\omega 1$ is assigned to mantissa of latitude as 0.50 i.e. 50%, and Weight $\omega 2$ is assigned to mantissa of longitude as 0.50 i.e. 50%.

According to embodiments of the present disclosure, for computing the privacy metric, let's consider the latitude and the longitude of the location i.e., "Vydehi hospital Bengaluru". At first, the latitude value of the location Vydehi hospital Bengaluru is "12.9752267" (Table 1) may be considered. As it may be observed that the characteristic value is 12, and the mantissa value is 9752267, where the k=7 i.e., the number of digits in the mantissa value. Now, while uploading the data segment (latitude in this case), the following options may be available for the data owner. With each option, a privacy leakage is calculated as shown in Table 4 below:

TABLE 4

Privacy leakage calculation for latitude data.

| Options | Privacy leakage calculation for latitude data |
|---|---|
| 12.9 N | (Characteristic value: 50%) + n = 1, k = 7 > (1/7) * ($\omega 1$: 50%) = 7.14% |
| 12.97 N | (Characteristic value: 50%) + n = 2, k = 7 > (2/7) * ($\omega 1$: 50%) = 14.28% |
| 12.975 N | (Characteristic value: 50%) + n = 3, k = 7 > (3/7) * ($\omega 1$: 50%) = 21.42% |
| 12.9752 N | (Characteristic value: 50%) + n = 4, k = 7 > (4/7) * ($\omega 1$: 50%) = 28.57% |
| 12.97522 N | (Characteristic value: 50%) + n = 5, k = 7 > (5/7) * ($\omega 1$: 50%) = 35.71% |
| 12.975226 N | (Characteristic value: 50%) + n = 6, k = 7 > (6/7) * ($\omega 1$: 50%) = 42.85% |
| 12.9752267 N | (Characteristic value: 25%) + n = 7, k = 7 > (7/7) * ($\omega 1$: 50%) = 50% |

Thus, it can be seen from the Table 4 that the privacy leakage of the first option (12.9) is quite less i.e., 7.14% than last option (12.9752267) i.e., 50%. After calculating the privacy leakage of the latitude, the longitude value of the location Vydehi hospital Bengaluru is considered i.e., "77.7292916". From the longitude (77.7292916), it may be observed that the characteristic value is 77 and the mantissa value is 7292916, where the k=7 i.e., the number of digits in the mantissa value. Now, while uploading the data segment (longitude in this case), the following options may be available for the data owner. With each option, a privacy leakage is calculated as shown in Table 5 below:

TABLE 5

Privacy leakage calculation for longitude data.

| Options | Privacy leakage calculation for longitude data |
|---|---|
| 77.7 E | (Characteristic value: 50%) + n = 1, k = 7 > (1/7) * ($\omega$2: 50%) = 7.14% |
| 77.72 E | (Characteristic value: 50%) + n = 2, k = 7 > (2/7) * ($\omega$2: 50%) = 14.28% |
| 77.729 E | (Characteristic value: 50%) + n = 3, k = 7 > (3/7) * ($\omega$2: 50%) = 21.42% |
| 77.7292 E | (Characteristic value: 50%) + n = 4, k = 7 > (4/7) * ($\omega$2: 50%) = 28.57% |
| 77.72929 E | (Characteristic value: 50%) + n = 5, k = 7 > (5/7) * ($\omega$2: 50%) = 35.71% |
| 77.729291 E | (Characteristic value: 50%) + n = 6, k = 7 > (6/7) * ($\omega$2: 50%) = 42.85% |
| 77.7292916 E | (Characteristic value: 25%) + n = 7, k = 7 > (7/7) * ($\omega$2: 50%) = 50% |

After calculating the privacy leakage for the latitude data and the longitude data, an accounting percentage leakage for mantissa may be computed as"

Privacy leakage(mantissa)={($[n_{(Latitude)}/k_{(Latitude)}]$ *$\omega_1$)+($[n_{(Longitude)}/k_{(Longitude)}]$*$\omega_2$)}

It may be understood, though the above equation is implemented for computing privacy leakage for location, however, the same equation may be used for computing the privacy leakage for different set of privacy leakage parameters. Based on the privacy leakage computed for characteristic value the mantissa value, a total privacy leakage may be computed as:

Total privacy leakage=privacy leakage(characteristic)+privacy leakage(mantissa)

Thus, after computing the total privacy leakage, a data aggregation corresponding to latitude and longitude may be seen from Table 6 below:

TABLE 6

Aggregate Privacy Leakage

| Sl. No | # of Bits | Latitude + Longitude | Aggregate Privacy Leakage | |
|---|---|---|---|---|
| 1 | n = 1, k = 5 | 10% + 10% = | 20% | |
| 2 | n = 2, k = 5 | 20% + 20% = | 40% | RISK |
| 3 | n = 3, k = 5 | 30% + 30% = | 60% | |
| 4 | n = 4, k = 5 | 40% + 40% = | 80% | |
| 5 | n = 5, k = 5 | 50% + 50% = | 100% | |

Thus, it can be observed from Table 5 and Table 6 is that, if n=k then the risk is maximum. From Table 6, an increase in a risk level can be observed. Thus, while uploading the data segments, the data owner can decide about the data segments to be uploaded to the system 104.

According to embodiments of the present disclosure, the weights may be assigned depending upon the privacy concerns of the data owners. According to an example, data may comprise location, age, and time (i.e., data segments, also referred to as privacy leakage parameters in the present disclosure). To each of the data segment (location, age, and time) default weight may be assigned by the platform. Further, the present disclosure also provides the facility for the data owner to change/update the defaults weights by assigning new weights to the data segments depending upon their privacy concerns. In one example, a data owner may assign higher weight to the location, as the location may be the privacy concern for the data owner. In another example, the data owner may assign higher weight to the age, as the age may be the privacy concern for the data owner. Yet, in another example, the data owner may assign higher weight to the time, as the time may be the privacy concern for the data owner. Thus, it should be understood to a person skilled in art, that the weights may be assigned to the data segments such as, but not limited to, "location", "age", and "time" associated with the data owner. Based on the weight assigned to the data segments, the privacy metric module 220 computes the privacy metric or privacy leakage for each data segment and for the data to be uploaded.

Figure 7:
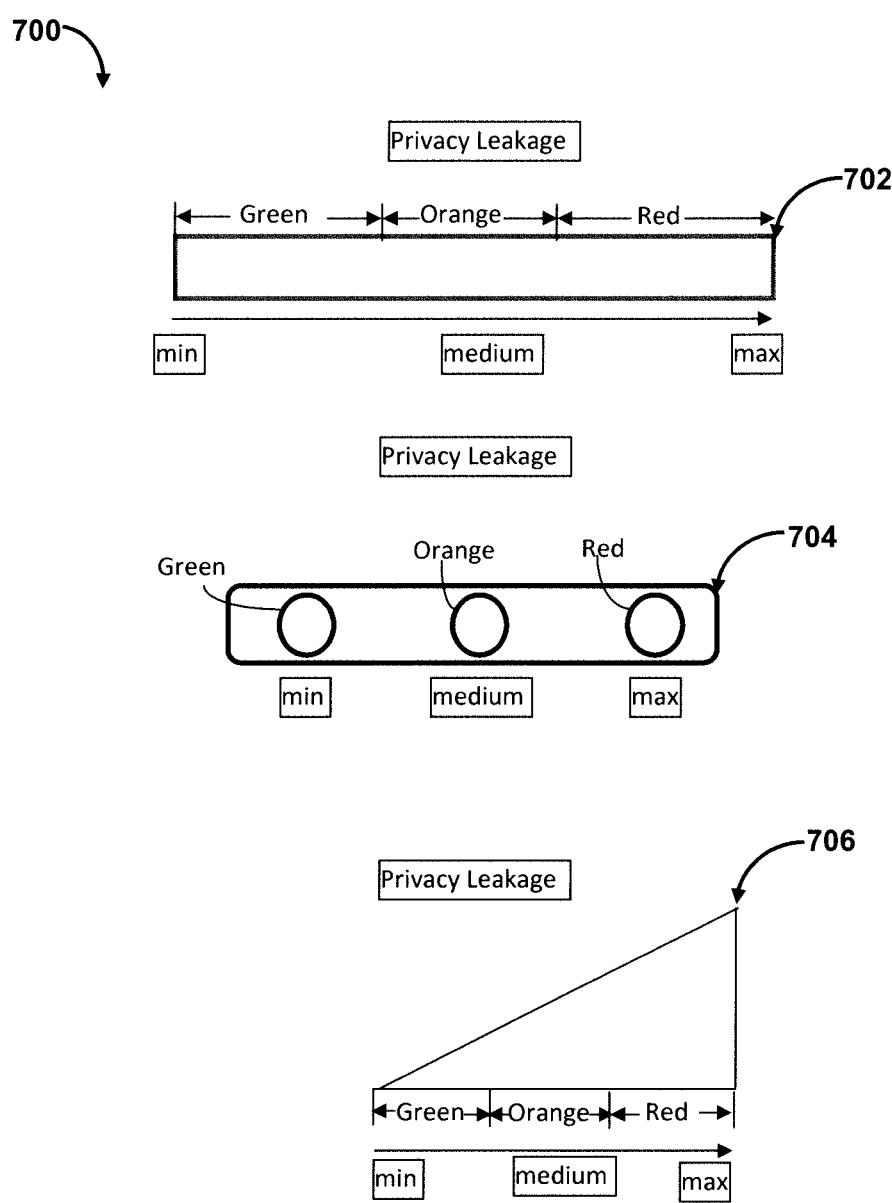
FIG. 7 illustrates a privacy leakage indicator, in accordance with an embodiment of the present subject matter.

Further, the privacy metric/privacy leakage computed may be classified into one or more classes. Each class of the one or more class may be displayed with unique color on a privacy leakage indicator (700) of FIG. 7. The privacy leakage indicator (700) may be further represented in a form of a slide bar (702) or a radio button (704). In one embodiment, the privacy leakage may be computed in terms of percentage, and classified as Low, Medium, and High. According to an example, the privacy leakage computed as Low, Medium, and High may range between 0% to 50%, 51% to 75%, and 76% to 100% respectively. Further, the classes Low, Medium, and High may also be represented with unique colors i.e., Green, Orange, and Red respectively. Further, the data owner is enabled to use the slide bar (702) or the radio button (704) to control the privacy leakage in the data segment. According to the data owner's choice of the percentage in the privacy leakage, the privacy metric module 220 of the device 102 may automatically consider the weight assigned by the data owner, and perform the data truncation where the amount of privacy leakage in the data segment may be controlled and privacy leakage may be also revised. For example, if the location data is considered i.e., 12.9 N as latitude and 77.7 E longitude where privacy leakage is 20% (As per table 6), the privacy leakage indicator 700 will show green color. Whereas, for the location data i.e., 12.9752 N as latitude and 77.7292 E as longitude, the privacy leakage is 80% (as per table 6), hence the privacy leakage indicator 700 will show red color.

On the basis of privacy metric computed, the data owner may decide over revealing or uploading of the data to the system 104. In one scenario, if the privacy metric computed for a particular data segment is high (i.e., having high risk), the data owner may have facility to change the privacy concerns (previously considered) and assign new weights to the data segments. In one embodiment, the user can also ignore some data segments while assigning the weight in order to adjust the privacy leakage before uploading the data segments or the data to the system 104. Thus, it may be considered as iterative process in which the privacy metric module 220 computes the privacy leakage based on the newly assigned weights (i.e., weights assigned to the data segments) before uploading the data to the system 104.

According to embodiments of present disclosure, the data owner may be given a choice of selecting a particular data segment having most concerned privacy leakage factor, and assigning weight to that particular data segment. Similarly, the data owner may also select least important data segment and assign least weight to it. Based on the weigh assignment for the most concerned privacy leakage data segment, and least important privacy leakage data segment, an overall privacy metric may be computed.

In one example, for computing the overall privacy metric, the most important privacy leakage data segment may be considered as "location", and the least important privacy leakage data segment may be considered as "time". Considering $\alpha_{loc}$ as a weight assigned for the location (i.e., the most important privacy leakage data segment). Similarly, considering $\alpha_{time}$ as a weight assigned for the time (i.e., the least important privacy leakage data segment). Further, quantification of α value can be either defined by the device 102 or by the data owner. In one embodiment, the overall privacy metric may be computed using below Equation 1:

$$\Sigma_{i=1}{}^{n}\alpha i\ Pl(attr) \qquad \text{Equation 1,}$$

wherein α refers to weight assigned corresponding to Pl(attr), wherein the Pl(attr) indicates the privacy leakage data segment as described above e.g., location, age, time and the like. Further, the α assigned is dependent upon the priority of each data segment, wherein the priority may be determined based upon the importance or significance of the privacy leakage data segment. In another embodiment, the equation 1 may be normalized based upon the number of privacy leakage parameters, thereby generating normalized equation as below:

$$\Sigma_{i=1}{}^{n}\alpha i\ Pl(attr)/n \qquad \text{Equation 2,}$$

wherein the α refers to weight assigned corresponding to Pl(attr), wherein the Pl(attr) indicates the privacy leakage data segment (privacy leakage parameter), and n indicates the number of privacy leakage parameters.

According to embodiments of present disclosure, the uploading module 222 may be further configured to upload the plurality of data segments based on an upload policy. The upload policy may be defined using plurality of privacy leakage parameters for uploading the plurality of data segments. According to one example, one of the privacy leakage parameters may be "time". The time may be represented as YY:MM:DD:HH:MM:SS i.e., YEAR:MONTH:DATE:HOUR:MINUTES:SECONDS. In this case, if the uploading module 222 upload the time data as YY:MM:DD:HH, it may an indicative of 0% privacy leakage. Whereas, if the uploading module 222 upload the time data as YY:MM:DD:HH:MM:SS, it may be an indicative of 100% privacy leakage.

In another example, the privacy leakage parameter may be "age". In one scenario, if the age of the data owner is "x" and the data owner uploads his/her age as "x" through the uploading module 222, then there would be a 100% privacy leakage. In another scenario, if the data owner upload his/her age in ranges such as 20-25, 26-30, 31-35 etc., through the uploading module 222, certain percentage of privacy leakage may be prevented.

Yet, in another example, the privacy leakage parameter may be "reporting co-relevance" calculation such as Incident Observation Location (IOL), Incident Observation Time (IOT), Incident Reporting Location (IRL), and Incident Reporting Time (IRT). According to the present example, different scenarios may be formed for determining the privacy leakage of the data which is shown in table below:

TABLE 7

Different scenarios for privacy leakage

| | |
|---|---|
| Scenario 1 | If (IOL and IRL) and (IOT and IRT) are same, then 100% privacy leakage |
| Scenario 2 | Though (IOL and IRL) can be same and (IOT and IRT) are different, then it's not 100% privacy leakage |
| Scenario 3 | If (IOL and IRL) are different and (IOT and IRT) are different, then it is 0 % privacy leakage |

Considering a case in which the data owner records and upload a pothole data at M G Road Bengaluru having following information:

The latitude of M G Road Bengaluru=12.974727000000000000 N
The longitude of M G Road Bengaluru=77.609365300000030000 E
Time=2012:12:14:16:45:30 IST (i.e. YYYY:MM:DD:HH:MM:SS format)

From the above recorded pothole data, the system 104 can conclude that the Incident Observation Location (IOL) is MG Road Bengaluru, and the Incident Observation Time (IOT) is 2012:12:14:16:45:30 IST. According to the Scenario 1, if the data owner uploads the pothole data in the same location and time then, the system 104 can conclude that Incident Reporting Location (IRL) is MG Road Bengaluru, and Incident Reporting Time (IRT) is 2012:12:14:16:45:30 IST. Thus, in this case, there is 100% privacy leakage of the data owner to be tracked for his/her location.

Considering another case in which the data owner uploads the pothole data in the same location (MG Road Bengaluru) but at different time i.e., IRL=MG Road Bengaluru, and IRT=2012:12:14:XX:XX:XX. Thus, this case is not a 100% privacy leakage as the observation time (i.e., 2012:12:14:16:45:30 IST) and reporting time (2012:12:14:XX:XX:XX) is different.

Considering yet another case in which the data owner uploads the pothole data in different location and at different time i.e., IRL=Shivajinagar Bengaluru, and IRT=2012:12:14:XX:XX:XX IST. Thus, the present case may be considered as best for preventing privacy leakage as the reporting location and reporting time is different.

According to embodiments of present disclosure, the privacy leakage parameter may be metadata associated with the data owner. The metadata may be description about an incident revealing privacy data of the data owner. For example, the data owner may want to hide the location detailing by uploading the Whitefield Bengaluru co-ordinates, wherein the co-ordinates may be valid for a radius of certain distance. Now, in the metadata if the data owner specifies a landmark which reveals the exact co-ordinate i.e., opposite XCR market in the Whitefield, then there is privacy leakage. In one embodiment, based upon the privacy leakage metric, though some of the privacy leakage parameters like location are prevented from being getting accessed, however, there may be interdependent parameters associated with the location that may leak the location. For example, in this embodiment, co-relevant metadata in a clicked image (i.e., an interdependent parameter) of the location may facilitate in capturing of prominent landmarks associated with the location, and therefore may reveal the location. The present disclosure enables to identify such interdependent parameters in order avoid such revealing of the information to be prevented from leakage. Thus, the device 102 may avoid uploading the interdependent parameters.

Thus, considering all the above privacy leakage parameters, the upload policy may be defined. Further, the uploading module 222 uploads the data segments to the system 104 based on the upload policy defined.

Thus, using the equations 1 and 2 (explained earlier in detail), an overall privacy metric may be computed based on the above discussed privacy leakage parameters i.e., the location, the time, the personal information (i.e., age), the co-relevance, and the metadata. Therefore, for computing the overall privacy leakage, the equations 1 and 2 may be implemented as:

[αloc PL(Location)+αtime PL(time1)+αtime PL(time2)+ αPI PL(Personal Information)+αCR PL(Co-Relevance)+ αM PL(Metadata)] in accordance with the equation1, and [αloc PL(Location)+αtime PL(time1)+αtime PL(time2)+ αPI PL(Personal Information)+αCR PL(Co-Relevance)+ αM PL(Metadata)]/6 in accordance with the equation2, where 6 refer to the total number of privacy leakage parameters considered for computing the overall privacy leakage.

At the system 104, a receiving module 312 receives the data segments i.e., coarse data and fine data (in the encrypted form). Further, the system 104 also has the Access Trees (Access Tree 1 and Access Tree 2) and the Access Policy stored in Access Policy and Access Tree database 326 of the system 104. According to the present example, the access tree (generated by the PKG module 310 of the system 104) comprises the plurality of attributes i.e., the "Director", the "Manager", the "Dy. Manager", and the "Supervisor". The receiving module 312 may be further configured to receive an access request from a data accessor. The access request received further comprises a request attribute owned by the data accessor. For providing the access of the data segment, the system 104 has to verify whether the request attribute is authorized for accessing the data segments. For facilitating the verification, a correlating module 314 of the system 104 may be configured to validate if the request attribute satisfy the Access Policy i.e. ("Director", the "Manager", the "Dy. Manager", and the "Supervisor"), based on the access tree (Access tree 1 and Access tree 2) generated for the data segment.

For example, if the access request is received from the data accessor having an attribute "Supervisor" for accessing the data segment such as fine data, the system 104 will not allow the data accessor (having the attribute as Supervisor) for accessing the fine data. Based on the Access Tree 2, the correlating module 314 rejects the accessibility of the fine data by the data accessor owns the attribute as "Supervisor". In another example, if the access request is received from a data accessor having the attribute as "Director" for accessing the data segment such as the fine data, the system 104 may allow the data accessor (having the attribute Director) for accessing the fine data. In this case, the correlating module 314 may again use the Access Tree 2 for determining the accessibility of the fine data. Thus, based on the Access Tree 2, the correlating module 314 accepts the accessibility of the fine data by the data accessor having the attribute as "Director".

Once the request attribute satisfies the Access Policy, the correlating module 314 further configured to obtain a decryption key for the attribute, of the plurality of attributes, validated against the request attribute. The decryption key obtained may be stored in the memory 306 of the system 104. In the present case, a decryption key associated with the attribute "Director" is obtained. Further, a data access module 316 of the system 104 may be configured to de-cipher the data segment (fine data) by using the decryption key obtained (corresponding to the fine data). Thus, the data access module 316 facilitates the access of the data segment (fine data) to the data accessor, based on the attribute owned by the data accessor. Further, a feedback module 318 of the system 104 may provide feedback to the device 102 of the data owner regarding the utilization of the data in the system 104.

According to an embodiment of present disclosure, the system 104 also provides validation of the data received from the participants or data owners at the system 104. If the data owner opts to help the survey, then the system 104 may ping them for the data (sensory data) and hence facilitates validation. Considering an example, where five data owners belonging to a same city participating in the participatory sensing framework (system 104) for sharing the data related to a survey. If one of the data owner of the five data owners reports to the system 104 about an event like earthquake, then the system 104 may perform validation for confirming about the event by pinging the other data owners.

Figure 5:
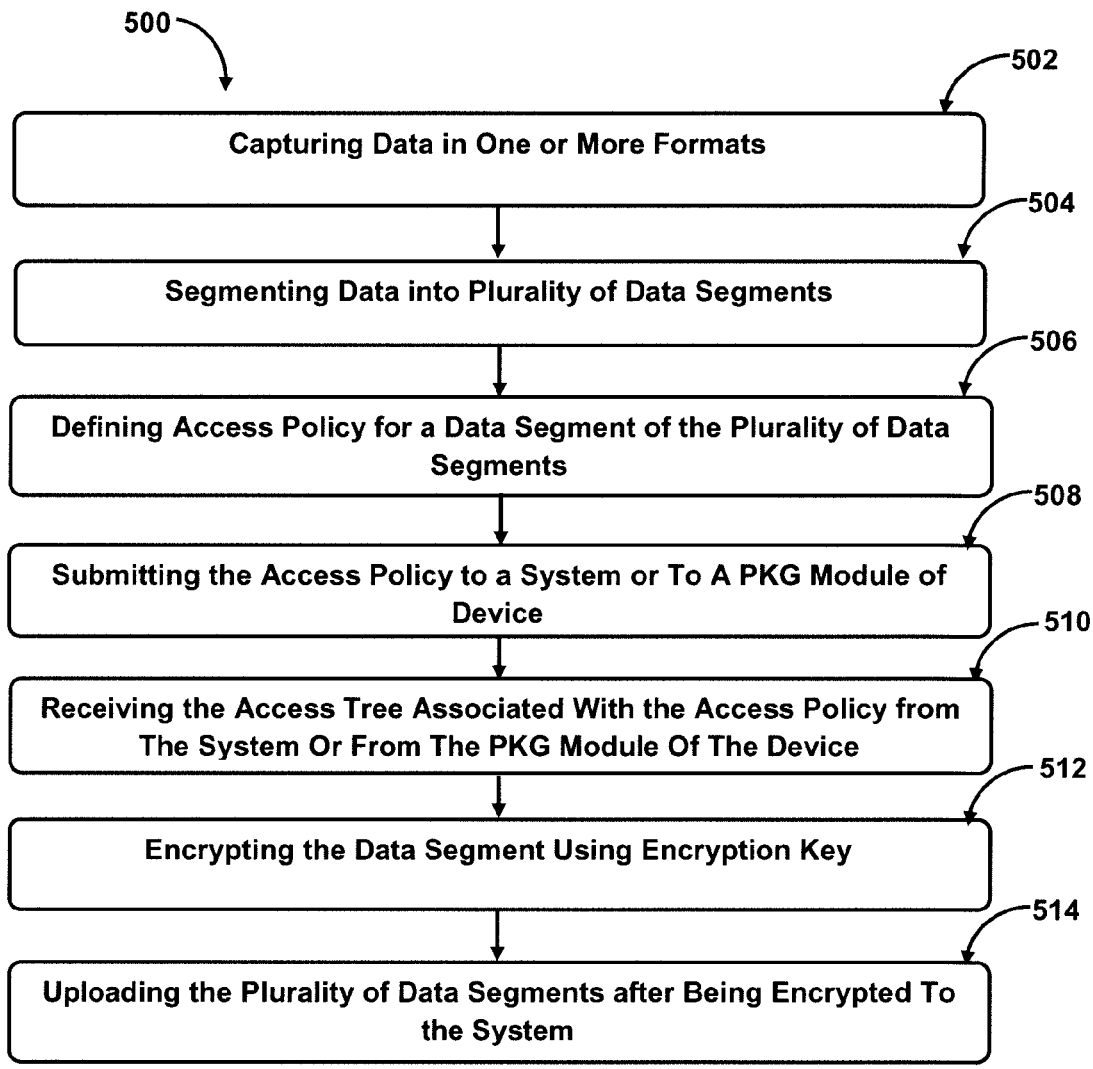
FIG. 5 illustrates a method for securing data to be accessed by a plurality of data accessors, in accordance with an embodiment of the present subject matter.

Referring now to FIG. 5, method for securing data to be accessed by a plurality of data accessors is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combinations thereof. However, for ease of explanation, in the embodiments described below, the method 500 may be considered to be implemented in the above described device 102.

At block 502, the data may be captured in one or more formats. The data captured may be a sensory data captured/collected for various sensing topics. The various sensory topics may be traffic monitoring, disaster monitoring, road surface monitoring, pollution check, and location monitoring. In one example, if the sensing topic is the location monitoring, then the sensors like cameras or Global Positioning System (GPS) sensors may be used for capturing sensory data such as latitude and longitude of the location.

At block 504, the data is segmented into plurality of data segments. In one example, the data may be segmented into coarse data and fine data. Here, the coarse data and the fine data are considered as the plurality of data segments. For example, if the latitude of a location "Kempegowda Bus Station (KBS)" is captured as 12.9768, then the coarse data is 12 (characteristic value) and the fine data is 9768 (mantissa value). Similarly, if the longitude of the location "Kempegowda Bus Station (KBS)" is captured as 77.5726, then the coarse data is 77 (characteristic value) and the fine data is 5726 (mantissa value).

At block 506, an access policy may be defined. Further, the access policy is defined corresponding to a data segment of the plurality of data segments. In the present case, Access Tree may be defined for the coarse data and the fine data. Further, the access policy comprises plurality of attributes associated with a plurality of data accessors. Further, the attribute indicates accessing rights of the data accessor.

At block 508, the access policy defined in the block 506 is submitted to the system or to PKG module 224 of the device 102. Further, the PKG module 310 of the system 104, and the PKG module 224 of the device 102 processes the access policy to generate a access tree. Further, the access tree is transmitted to the device 102 when the PKG module 310 of the system 104 generates the access tree.

At block 510, the access tree (generated by the PKG module 310 or by the PKG module 224) associated with the access policy is received from the system 104. Further, the access tree received comprises plurality of attributes arranged in a hierarchy using a set of boolean operators such as AND, OR, and NOT. Further, with each attribute, of the plurality of attributes, present in the access tree is associated with an encryption key.

At block 512, the data segment is encrypted by using an encryption key associated with the attributes present in the Access Tree. According to embodiments of present disclosure, a Key-Policy Attribute-Based Encryption (KP-ABE) scheme/Ciphertext-Policy Attribute-Based Encryption (CP-ABE) scheme and Elliptical Curve Cryptography (ECC) is used for encrypting the data segment. Further, the use of such KP-ABE scheme or the CP-ABE scheme along with the ECC, a light weight, faster, secured and a certificate less distribution of the encryption keys is provided to the plurality of attributes.

At block 514, the plurality of data segments (after being encrypted or secured) is uploaded to a system 104, whereby the system 104 is configured for facilitating access of the plurality of data segments to the plurality of data accessors when the request attribute satisfies the Access Policy.

Figure 6:
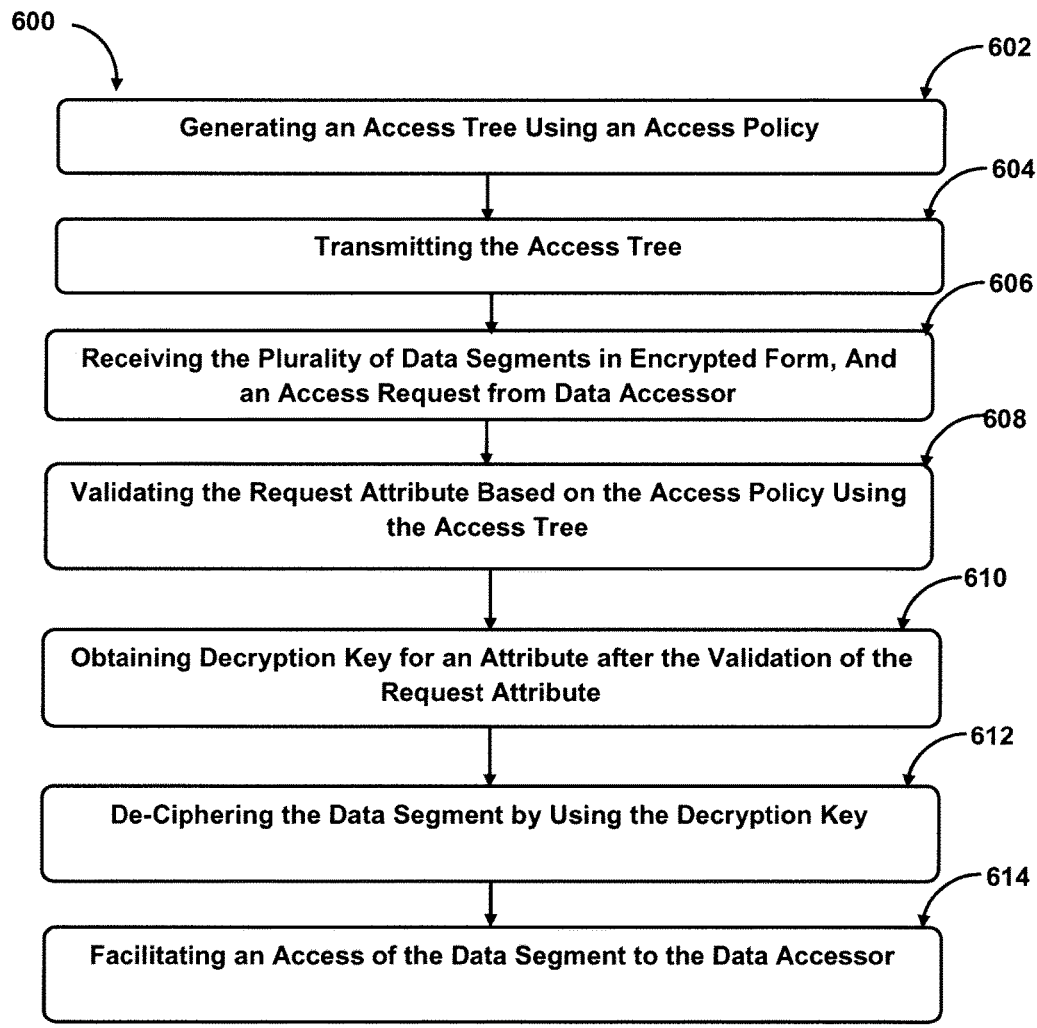
FIG. 6 illustrates a method for facilitating access of data to a plurality of data accessors, in accordance with an embodiment of the present subject matter.

Referring now to FIG. 6, a method for facilitating access of data to a plurality of data accessors is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combinations thereof. However, for ease of explanation, in the embodiments described below, the method 600 may be considered to be implemented in the above described system 104.

At block 602, an access tree, based on the access policy received by the system 104, is generated. The access tree comprises plurality of attributes arranged in hierarchy using a set of boolean operators. Further, each attribute, of the plurality of attributes, present in the access tree is associated with an encryption key.

At block 604, the access tree generated is transmitted to the device 102.

At block 606, a plurality of data segments in an encrypted form, and an access request from a data accessor is received. According to present disclosure, plurality of data segments received is coarse data and fine data (refer to Table 2). Further, the access tree are Access Tree 1 and Access Tree 2 having the plurality of attributes (as per Table 3) are stored in access policy and access tree database 326 of the system 104. Further, the access request comprises a request attribute associated with the data accessor.

At block 608, the request attribute is validated based on the Access Policy using the Access Tree. In one example, if the request attribute as "Supervisor" is received for accessing the data segment (fine data), then the matching may be performed by using the Access Tree 2 for verifying whether the request attribute "Supervisor" is authorized for accessing the fine data. As per the Access Tree 2, the data accessor owning the attribute as "Supervisor" is not allowed to the access the data segment i.e., the fine data. Hence, the data accessor may not be allowed for accessing the fine data. In another example, if the request attribute as "Director" is received for accessing the data segment (fine data), then the matching may be performed by using the Access Tree 2 for verifying whether the request attribute "Director" is authorized for accessing the fine data. As per the Access Tree 2, the data accessor holding the attribute as "Director" is allowed to the access the data segment i.e., the fine data. Thus, the data accessor is allowed for accessing the fine data.

At block 610, after the request attribute positively validated against the Access Policy, a decryption key associated with the attribute (of the plurality of attributes) matched is obtained. According to the example discussed in the block 608, the decryption key associated with the attribute "Director" is obtained.

At block 612, de-ciphering of the data segment (fine data in present case) is performed by using the decryption key obtained in the block 610 for the fine data.

At block 614, access of the data segment is facilitated to the data accessor, based on the attribute of the data accessor.

Although implementations for devices, methods and systems for securing the data and providing attribute based access to the data have been described in language specific to structural features and/or methods, it is to be understood that the appended claims are not necessarily limited to the specific features or methods described. Rather, the specific features and methods are disclosed as examples of implementations for providing attribute based access of the data.

What is claimed is:

1. A device for securing data to be accessed by a plurality of data accessors, the device comprising:
   a processor;
   a plurality of sensors to capture data in one or more formats; and
   a memory coupled to the processor, wherein the processor executes a plurality of modules stored in the memory, and wherein the plurality of modules comprising:
   a segmenting module to segment the data into a plurality of data segments;
   a defining module to define an access policy corresponding to a data segment of the plurality of data segments, wherein the access policy comprises a plurality of attributes associated with a plurality of data accessors, and wherein an attribute of the plurality of attributes indicates an accessing right of a data accessor for accessing the data segment;
   a submitting module to submit the access policy to a system or to a public key generation (PKG) module of the device;
   receiving module to receive an access tree associated with the access policy from the system or from the public key generation (PKG) module, wherein the access tree comprises the plurality of attributes arranged in hierarchy using a set of boolean operators, and wherein each attribute, of the plurality of attributes, present in the access tree is associated with an encryption key; and an encrypting module to encrypt the data segment using the encryption key associated with each attribute, wherein the encryption key is obtained using an attribute based encryption scheme, and wherein when the attribute based encryption scheme is the Ciphertext-Policy Attribute-Based Encryption (CP-ABE), the submitting module submits the access policy to the public key generation (PKG) module of the device, wherein the PKG module generates the access tree based on the access policy, and the receiving module receives the access tree associated with the access policy from the public key generation (PKG) module.

2. The device of claim 1, wherein the attribute based encryption scheme is one of a Key-Policy Attribute-Based Encryption (KP-ABE) and the Ciphertext-Policy Attribute-Based Encryption (CP-ABE).

3. The device of claim 2, wherein when the attribute based encryption scheme is the KP-ABE the submitting module submits the access policy to the system, and the receiving module receives the access tree associated with the access policy from the system.

4. The device of claim 1 further comprising a privacy metric module for computing privacy leakage for the plurality of data segments based on weight assigned to the data segment of the plurality of data segments, wherein the weight is assigned by data owner based on privacy concerns of the data segment.

5. The device of claim 4, wherein the privacy leakage computed is further classified into one or more class, wherein each class, of the one or more class, is displayed with unique color on a privacy leakage indicator, wherein the privacy leakage indicator is represented in form of a slide bar or a radio button.

6. The device of claim 1 further comprising an upload module for:

uploading the plurality of data segments to the system, wherein the system facilitates accessing of the plurality of data segments to the plurality of data accessors, and uploading the plurality of data segments based on an upload policy, wherein the upload policy is defined using plurality of privacy leakage parameters for uploading the plurality of data segments.

7. The device of claim 1, wherein the submitting module further submits a domain-specific configuration file comprising configuration parameters and configuration settings to the system in order to receive an application package file (apk file) corresponding to the domain-specific configuration file.

8. A method for securing data to be accessed by a plurality of data accessors, the method comprising:

capturing, by a sensor, data in one or more formats;

segmenting, by a processor, the data into a plurality of data segments;

defining, by the processor, an access policy corresponding to a data segment of the plurality of data segments, wherein the access policy comprises a plurality of attributes associated with a plurality of data accessors, and wherein an attribute of the plurality of attributes indicates an accessing right of a data accessor for accessing the data segment;

submitting, by the processor, the access policy to a system or to a public key generation (PKG) module of the device;

receiving, by the processor, an access tree associated with the access policy from the system or from the public key generation (PKG) module, wherein the access tree comprises a plurality of attributes arranged in hierarchy using a set of boolean operators, and wherein each attribute, of the plurality of attributes, present in the access tree is associated with an encryption key;

encrypting, by the processor, the data segment using the encryption key associated with each attribute, wherein the encryption key is obtained using an attribute based encryption scheme; and uploading the plurality of data segments based on an upload policy, wherein the upload policy is defined using plurality of privacy leakage parameters for uploading the plurality of data segments.

9. The method of claim 8 further comprising uploading the plurality of data segments in an encrypted form to the system, wherein the system facilitates accessing of the plurality of data segments to the plurality of data accessors.

10. The method of claim 8, further comprising identifying interdependent parameters associated with at least one of the privacy leakage parameters, wherein at least one data segment corresponding to the interdependent parameters is prevented from being uploaded to the system.

11. The method of claim 8, wherein the attribute based encryption scheme is implemented using lightweight elliptic curve cryptography (ECC) technique.

12. A system for facilitating access of data to a plurality of data accessors, the system comprising:

a processor;

a memory coupled to the processor, wherein the processor executes a plurality of modules stored in the memory, and wherein the plurality of modules comprising:

a public key generation (PKG) module to receive an access policy from a device, wherein the access policy comprises a plurality of attributes associated with a plurality of data accessory, and wherein an attribute of the plurality of attributes indicates an accessing right of a data accessor, for accessing a data segment, generate an access tree based on the access policy, wherein the access tree comprises the plurality of attributes arranged in hierarchy using a set of boolean operators, and wherein each attribute, of the plurality of attributes, present in the access tree is associated with an encryption key, and transmit the access tree to the device;

a receiving module to receive a plurality of data segments in an encrypted form, and an access request from a data accessor, wherein the access request comprises a request attribute owned by the data accessor;

a correlating module to validate the request attribute based on the access policy using the access tree, and obtain a decryption key for an attribute of the plurality of attributes after the validation of the request attribute; and a data access module to de-cipher the data segment by using the decryption key, facilitate the access of the data segment to the data accessor, wherein the access of the data segment is facilitated based on an attribute of the plurality of attributes owned by the data accessor; and an application generation module 320 to generate an application package file (apk file) corresponding to domain-specific configuration file received from the device.

13. The system of claim 12 further comprising a feedback module to provide a feedback to the device, wherein the feedback is provided regarding utilization of the data upon the system.

14. The system of claim 12 further configured to notify a data owner and the data accessor about data upload based upon predefined conditions, wherein the predefined conditions are associated with the privacy leakage parameters.

* * * * *